(12) United States Patent
Sakaguchi et al.

(10) Patent No.: US 10,868,346 B2
(45) Date of Patent: Dec. 15, 2020

(54) COMPOSITE SHEET AND BATTERY PACK USING SAME

(71) Applicant: Panasonic Intellectual Property Management Co., Ltd., Osaka (JP)

(72) Inventors: Yoshiya Sakaguchi, Kyoto (JP); Norihiro Kawamura, Hokkaido (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 244 days.

(21) Appl. No.: 16/066,711

(22) PCT Filed: Mar. 9, 2017

(86) PCT No.: PCT/JP2017/009417
§ 371 (c)(1),
(2) Date: Jun. 28, 2018

(87) PCT Pub. No.: WO2017/159528
PCT Pub. Date: Sep. 21, 2017

(65) Prior Publication Data
US 2019/0013556 A1    Jan. 10, 2019

(30) Foreign Application Priority Data

Mar. 14, 2016 (JP) ................. 2016-049295

(51) Int. Cl.
*H01M 10/00* (2006.01)
*H01M 10/653* (2014.01)
(Continued)

(52) U.S. Cl.
CPC ............. *H01M 10/653* (2015.04); *B32B 3/14* (2013.01); *B32B 9/00* (2013.01); *H01M 2/0277* (2013.01);
(Continued)

(58) Field of Classification Search
CPC ........... H01M 10/653; H01M 10/0525; H01M 10/613; H01M 2220/30; B32B 3/14; H01G 11/18
See application file for complete search history.

(56) References Cited

U.S. PATENT DOCUMENTS

| 2013/0323564 A1* | 12/2013 | Beyerle, II | H01M 10/6555 |
| | | | 429/120 |
| 2016/0014878 A1* | 1/2016 | Kilhenny | H05K 3/0094 |
| | | | 257/99 |
| 2017/0182474 A1* | 6/2017 | Zhamu | B01J 20/20 |

FOREIGN PATENT DOCUMENTS

JP   2015-071727   4/2015

OTHER PUBLICATIONS

International Search Report of PCT application No. PCT/JP2017/009417 dated May 9, 2017.

* cited by examiner

*Primary Examiner* — Cynthia H Kelly
*Assistant Examiner* — Monique M Wills
(74) *Attorney, Agent, or Firm* — McDermott Will & Emery LLP

(57) ABSTRACT

A composite sheet includes a thermally-conductive sheet, a first insulating sheet that covers one surface of the thermally-conductive sheet, and a second insulating sheet that covers another surface of the thermally-conductive sheet, and seals the thermally-conductive sheet between the first and second insulating sheets. The thermally-conductive sheet has a first through hole provided therein. The composite sheet has an insulating lamination portion at which the first insulating sheet is stacked on the second insulating sheet to seal an inner wall surface of the first through hole. The insulating lamination portion has a second through hole provided inside the first through hole and having a hole (Continued)

diameter which is smaller than a hole diameter of the first through hole.

11 Claims, 8 Drawing Sheets

(51) Int. Cl.
*H01M 10/613* (2014.01)
*B32B 3/14* (2006.01)
*B32B 9/00* (2006.01)
*H01M 10/6555* (2014.01)
*H01M 10/6551* (2014.01)
*H01M 2/02* (2006.01)
*H01M 2/06* (2006.01)
*H01G 11/10* (2013.01)
*H01G 11/18* (2013.01)
*H01M 10/647* (2014.01)
*H01M 10/0525* (2010.01)

(52) U.S. Cl.
CPC ........... *H01M 2/0287* (2013.01); *H01M 2/06* (2013.01); *H01M 10/613* (2015.04); *H01M 10/6551* (2015.04); *H01M 10/6555* (2015.04); *H01G 11/10* (2013.01); *H01G 11/18* (2013.01); *H01M 10/0525* (2013.01); *H01M 10/647* (2015.04); *H01M 2220/30* (2013.01)

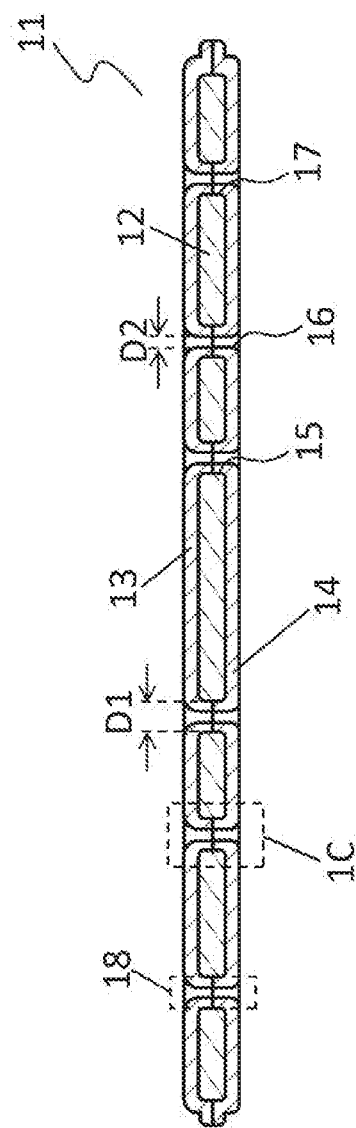

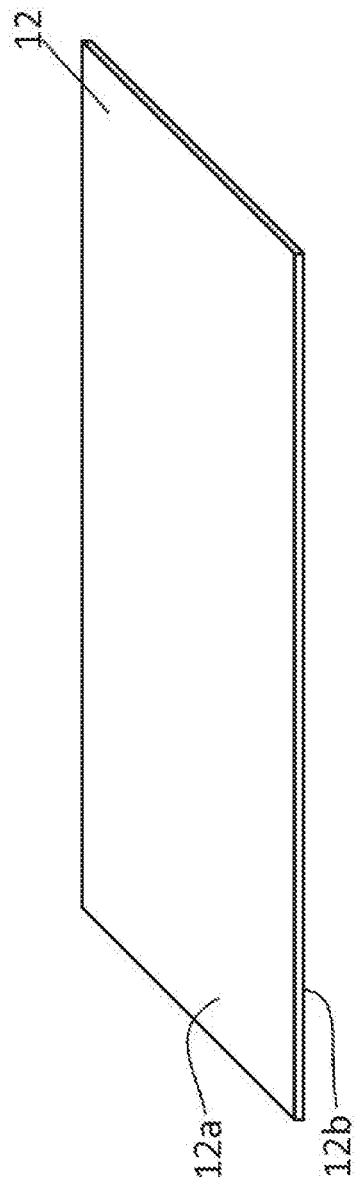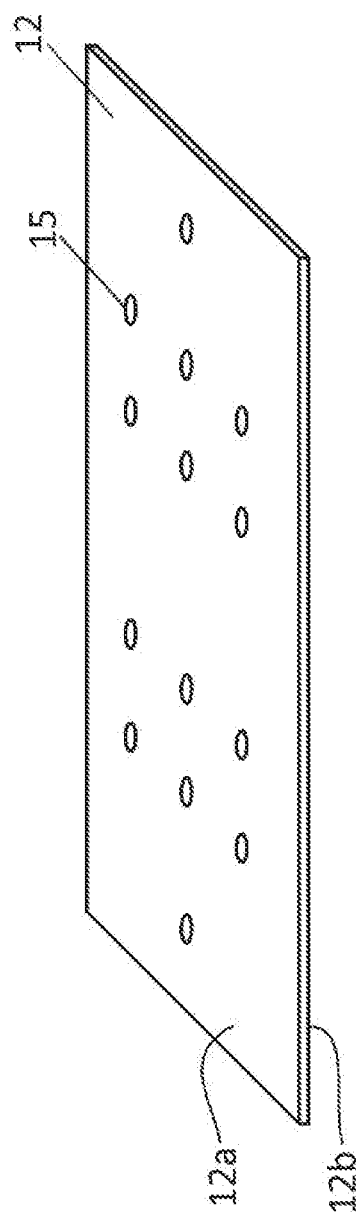

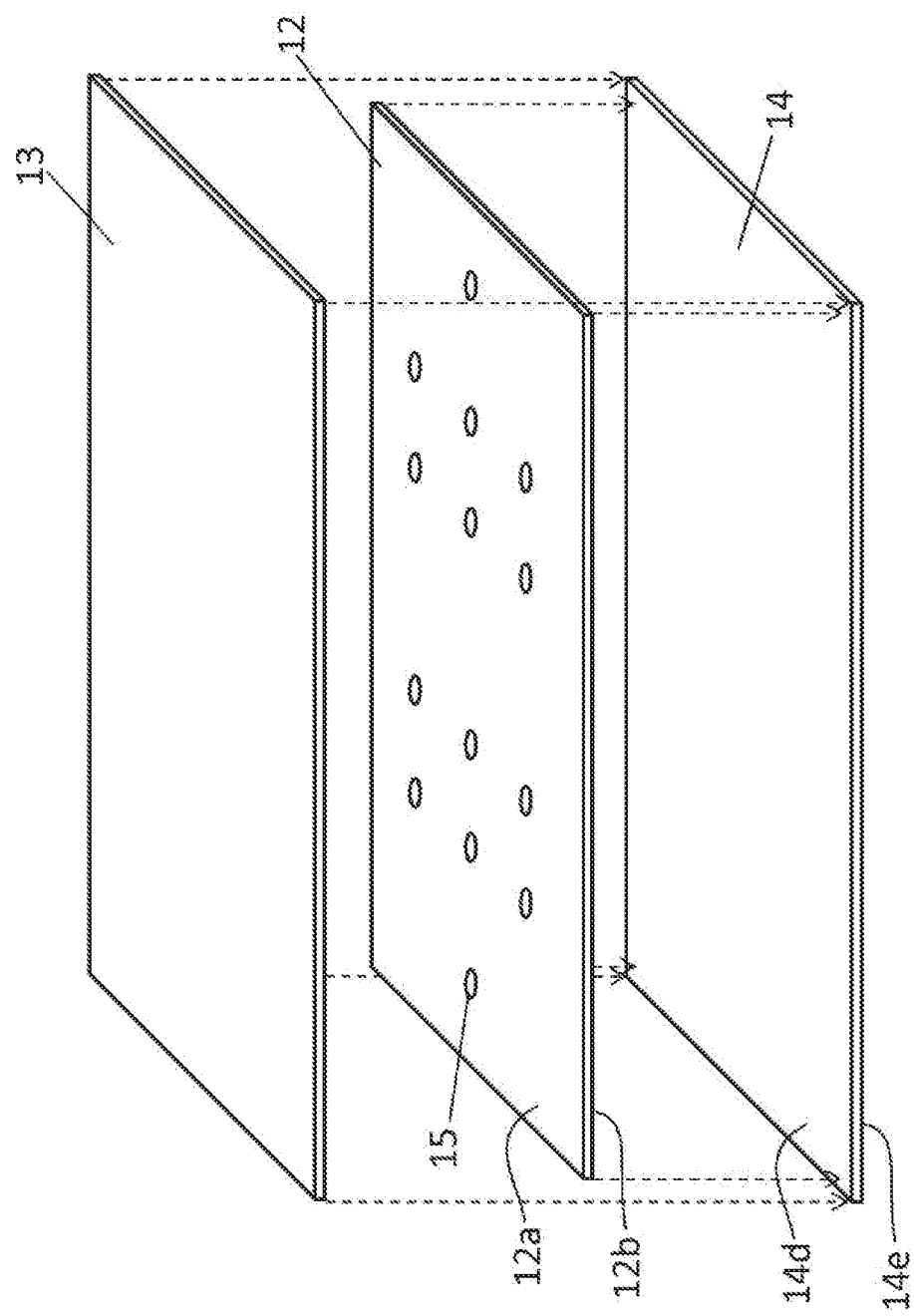

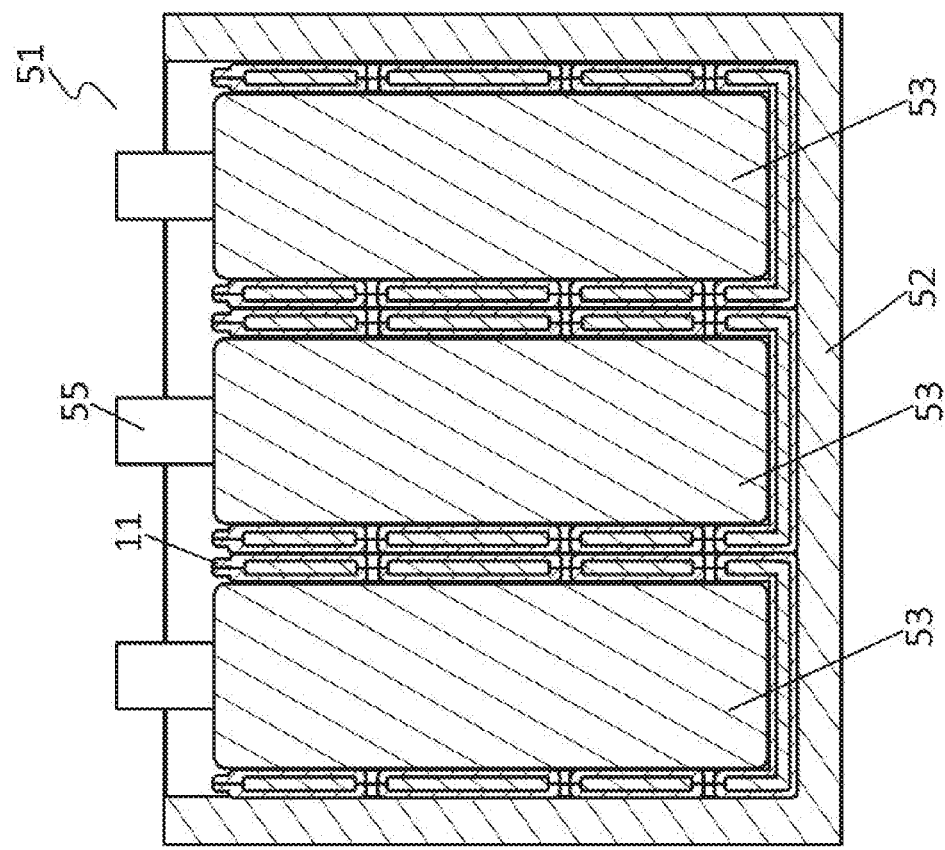

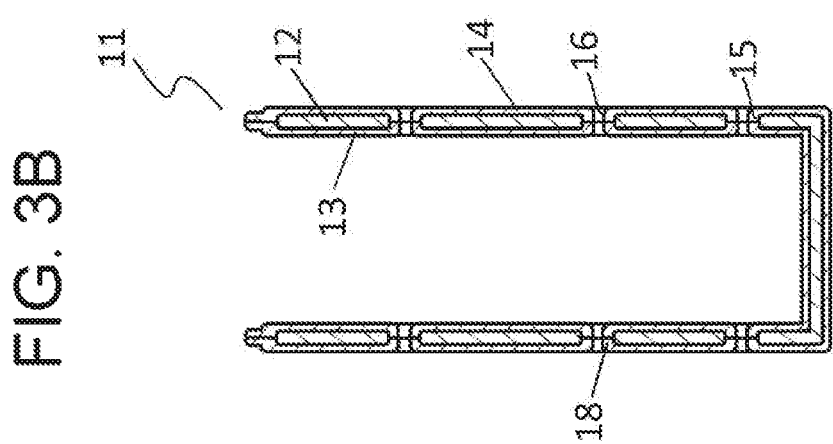

US 10,868,346 B2

COMPOSITE SHEET AND BATTERY PACK USING SAME

This application is a U.S. national stage application of the PCT international application No. PCT/JP2017/009417 filed on Mar. 9, 2017, which claims the benefit of foreign priority of Japanese patent application No. 2016-049295 filed on Mar. 14, 2016, the contents all of which are incorporated herein by reference.

TECHNICAL FIELD

The present disclosure relates to a composite sheet and a battery pack using same.

BACKGROUND ART

With sophistication and size-reduction of electronic equipment, the amount of heat generated by the electronic components used in the electronic equipment has been increasing. To dissipate the generated heat, thermally-conductive members such as the graphite sheets or the like have become used.

On the other hand, lithium ion secondary batteries have become equipped in various equipment, and the current capacity of the batteries has been increasing. Increase in the current capacity of the lithium ion batteries and increase in used current have been causing increase in the amount of heat generation. To dissipate the generated heat, thermally-conductive members such as the graphite sheets or the like have become used.

A known prior art reference related to the present application is, for example, PTL 1.

CITATION LIST

Patent Literature

PTL 1: Japanese Patent Laid-Open Publication No. 2015-71727

SUMMARY

A composite sheet according to an aspect of the present disclosure includes a thermally-conductive sheet, a first insulating sheet that covers one surface of the thermally-conductive sheet, and a second insulating sheet that covers another surface of the thermally-conductive sheet and seals the thermally-conductive sheet between the first and second insulating sheets. The thermally-conductive sheet has a first through hole. The composite sheet has an insulating lamination portion at which the first insulating sheet is stacked on the second insulating sheet to seal an inner wall surface of the first through hole. The insulating lamination portion has a second through hole disposed inside the first through hole and having a hole diameter that is smaller than a hole diameter of the first through hole.

The composite sheet according to the aspect of the present disclosure hardly causes an air bubble when it is adhered to a target device which requires heat dissipation or thermal conduction, and thus can realize a superior thermal conduction property.

BRIEF DESCRIPTION OF DRAWINGS

FIG. 1B is a sectional view of the composite sheet along line 1B-1B shown in FIG. 1A.

FIG. 2A illustrates a method of producing the composite sheet in accordance with the exemplary embodiment.

FIG. 2B illustrates the method of producing the composite sheet in accordance with the exemplary embodiment.

FIG. 2C illustrates the method of producing the composite sheet in accordance with the exemplary embodiment.

FIG. 3A is a sectional view of a battery pack in accordance with the exemplary embodiment.

FIG. 3B is a sectional view of a composite sheet used to construct the battery pack shown in FIG. 3A.

DETAILED DESCRIPTION OF PREFERRED EMBODIMENT

Exemplary embodiments will be described with reference to the drawings below.

Exemplary Embodiment

1. Configuration of Composite Sheet

Figure 1A:
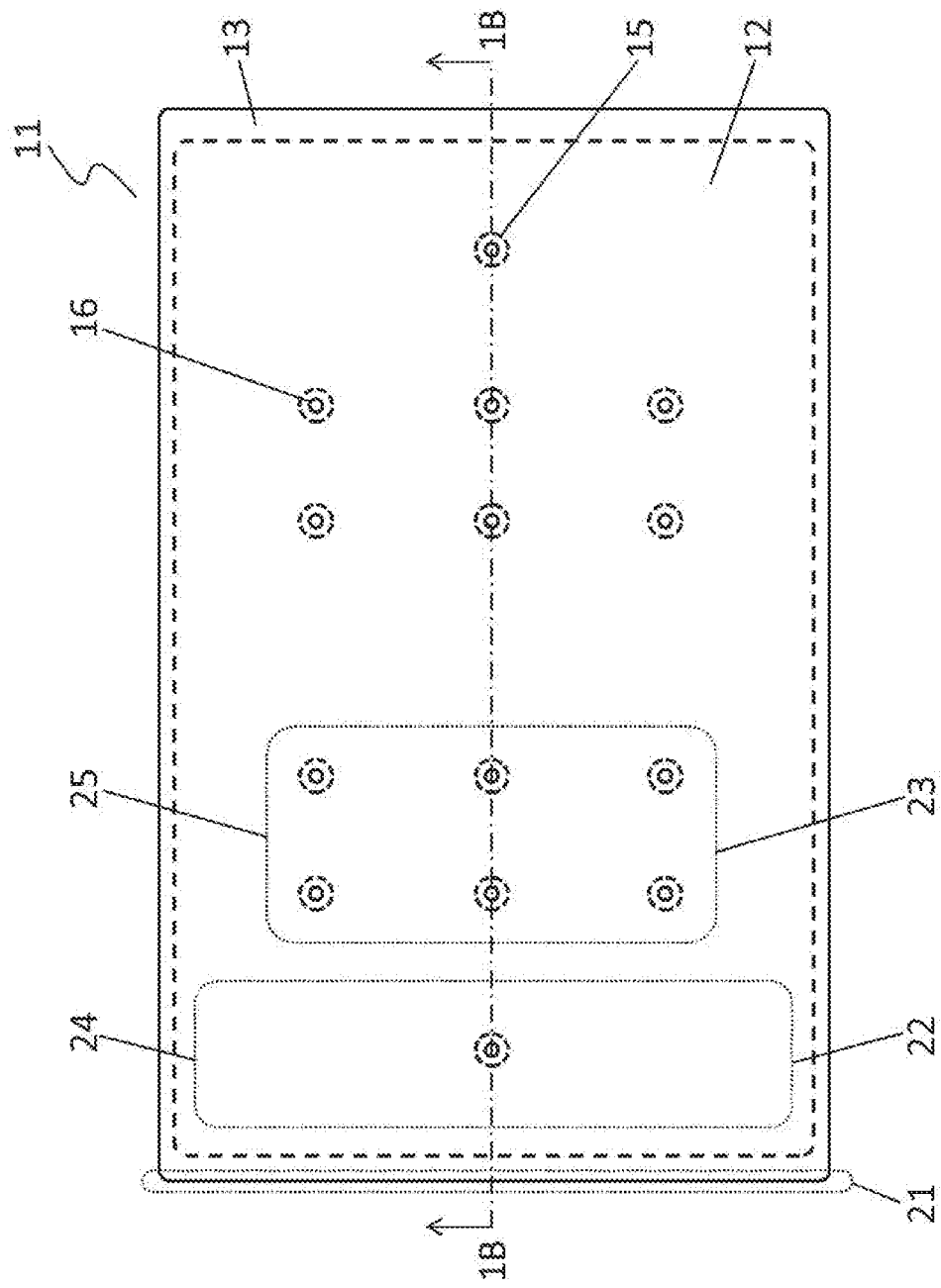
FIG. 1A is a plan view of a composite sheet in accordance with an exemplary embodiment.
Figure 1C:
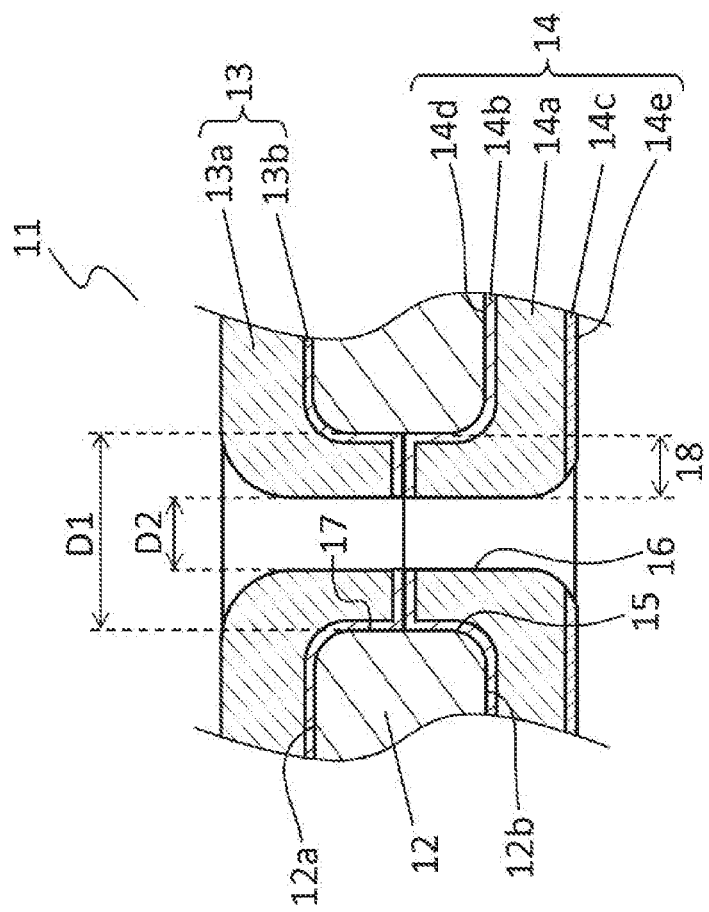
FIG. 1C is an enlarged sectional view of main part 1C of the composite sheet shown in FIG. 1B.

First, composite sheet 11 in accordance with an exemplary embodiment will be described with reference to FIGS. 1A to 1C. FIG. 1A is a plan view of composite sheet 11 in accordance with the exemplary embodiment. FIG. 1B is a sectional view of composite sheet 11 along line 1B-1B shown in FIG. 1A. FIG. 1C is an enlarged sectional view of main part 1C of composite sheet 11 shown in FIG. 1B. In FIG. 1A, thermally-conductive sheet 12 disposed inside composite sheet 11 is indicated by broken lines.

As shown in FIGS. 1A to 1C, composite sheet 11 includes thermally-conductive sheet 12, first insulating sheet 13 that covers one surface 12a of thermally-conductive sheet 12, and second insulating sheet 14 that covers another surface 12b of thermally-conductive sheet 12.

First insulating sheet 13 and second insulating sheet 14 have larger sizes than thermally-conductive sheet 12 and are bonded to each other outside an outer periphery of thermally-conductive sheet 12 to seal thermally-conductive sheet 12. As shown in FIG. 1C, thermally-conductive sheet 12 has one or more first through holes 15 provided therein. Inside each of one or more first through holes 15, first insulating sheet 13 and second insulating sheet 14 are stacked on each other to form insulating lamination portions 18. Each of insulating lamination portions 18 seals inner wall surface 17 of respective one of one or more first through holes 15. Each of second through holes 16 (hole diameter D2) is provided respective one of insulating lamination portions 18. Second through hole 16 is disposed inside each of one or more first through holes 15 and has hole diameter D2 which is smaller than hole diameter D1 of each of one or more first through holes 15. In accordance with the present exemplary embodiment, each insulating lamination portion 18 seals inner wall surface 17 of respective one of plural first through holes 15. In insulating lamination portion 18, second through hole 16 (hole diameter D2) is provided. Second through hole 16 is disposed inside each of the plurality of through holes 15 and has hole diameter D2 which is smaller than hole diameter D1 of each of the plurality of first through holes 15.

Composite sheet 11 contacts or is adhered to an external device (not shown), such as a heat generating device and a low temperature device, to be used as a thermally-conductive member for dissipating heat from the external device or for supplying heat to the external device. In order to provide preferable thermal conduction from or to the external device, composite sheet 11 is often used while being adhered to an outer surface of the external device.

2. Method of Producing Composite Sheet

Next, a method of producing composite sheet 11 in accordance with the exemplary embodiment will be described below with reference to FIGS. 2A to 2C. FIGS. 2A to 2C illustrates the method of producing composite sheet 11 in accordance with the exemplary embodiment.

First, as shown in FIG. 2A, a polyimide film is pyrolized to be graphitized, and then, is tanned to obtain thermally-conductive sheet 11 formed of a flexible graphite sheet.

Next, as shown in FIG. 2B, first through holes 15 are formed on thermally-conductive sheet 12 by a punching process with a punch die or by a laser beam processing.

Next, as shown in FIG. 2C, first insulating sheet 13 is adhered to one surface 12a of thermally-conductive sheet 12. Second insulating sheet 14 is adhered to another surface 12b of thermally-conductive sheet 12. In this process, first insulating sheet 13 and second insulating sheet 14 are stacked and adhered onto each other inside each first through hole 15 to form insulating lamination portion 18 which seals inner wall surface 17 of each first through hole 15, as shown in FIG. 1C.

Next, as shown in the above-described FIG. 1C, second through hole 16 having a pinhole size having a hole diameter smaller than hole diameter D1 of first through hole 15 is formed by a laser beam processing in insulating lamination portion 18 inside first through hole 15. This completes production of composite sheet 11 shown in FIG. 1A.

It is preferable that each of first insulating sheet 13 and second insulating sheet 14 contains a thermoplastic resin as a constitutional member. This allows each of first insulating sheet 13 and second insulating sheet 14 around second through hole 16 to be once molten by the laser beam processing and then fused, so that inner wall surface 17 of first through hole 15 can be favorably sealed. Also, it is possible by the laser beam processing to form second through hole 16 that has a very small hole diameter. Since first through hole 15 and second through hole 16 suppress thermal conduction, the hole diameters of first through hole 15 and second through hole 16 may preferably be as small as possible. To form first through hole 15 and second through hole 16 with small hole diameters, the laser beam processing is preferable as a method of forming first through hole 15 and second through hole 16.

3. Effects of Composite Sheet

When a conventional composite sheet is adhered to or placed in close contact with an external device, it has been a problem that, if an air bubble is caused between the composite sheet and the external device, the thermal conduction property reduces, so that a thermal failure may occur in the external device due to insufficient heat dissipation or insufficient heat supply. Further, if the air bubble expands with heat, the thermal conduction property further reduces. Furthermore, if the air bubble expands with heat, a pressure is applied to the external device, so that a mechanical failure of the external device may be caused.

On the other hand, when composite sheet 11 in accordance with the present exemplary embodiment is placed to contact or adhere onto an external device, the air between composite sheet 11 and the external device is exhausted from second through holes 16. Accordingly, cause of air bubbles between composite sheet 11 and the external device can be suppressed, so that superior thermal conduction property can be realized. As a result, it is possible to suppress occurrence of a thermal failures or a mechanical failure.

In a case where a thermally-conductive member is used while adhering onto or in contacting a target device, the possibility of causing an air bubble and the size of the air bubble increase with the increase of the contacting area.

On the other hand, composite sheet 11 in accordance with the present exemplary embodiment allows air to be exhausted through second through holes 16, so that air bubbles are hardly caused between composite sheet 11 and the external device. This effect is particularly remarkable in a case where the contact area between composite sheet 11 and the external device is large.

A graphite sheet having a thickness of, e.g. about 50 μm may be used as thermally-conductive sheet 12. The graphite sheet is superior in thermal conduction property, and has an in-plane thermal conductivity of about 1300 W/m·K. The graphite sheet has such an anisotropic thermal conduction property that its in-plane thermal conductivity is higher than its through-plane thermal conductivity. In composite sheet 11, the graphite sheet as thermally-conductive sheet 12 is particularly preferable since the thermal conduction property of composite sheet 11 becomes better.

Electrically conductive graphite powder may be produced from the graphite sheet. It is likely that the graphite powder adheres to circumjacent electronic circuit boards and causes a failure, such as a short circuit. The graphite sheet is sandwiched between first insulating sheet 13 and second insulating sheet 14 having larger sizes than the graphite sheet and are sealed outside the outer periphery of the graphite sheet. This structure prevents scatter of the graphite powder and occurrence of a failure of the circumjacent electronic circuits.

Hole diameter D1 of first through hole 15 is about 3 mm, and hole diameter D2 of second through hole 16 is about 0.3 mm The thermal conduction property decreases as the size of first through hole 15 becomes larger. Therefore, the size of first through hole 15 may be determined such that second through hole 16 can be formed and that inner wall surface 17 of first through hole 15 can be sealed with insulating lamination portion 18. Sealing with insulating lamination portion 18 may be made such that the graphite powder generated from inner wall surface 17 does not scatter to the outside. Although insulating lamination portion 18 is required to seal inner wall surface 17, insulating lamination portion 18 may not necessarily be adhered to inner wall surface 17.

Hole diameter D1 of first through hole 15 may preferably be equal to or larger than 1.0 mm to allow insulating lamination portion 18 to preferably seal inner wall surface 17 of first through hole 15. Hole diameter D1 of first through hole 15 may preferably be equal to or smaller than 3 mm to suppress reduction of the thermal conduction property.

Hole diameter D2 of second through hole 16 may have a size that allows air to pass through second through hole 16, and thus may be a very small size, such as a pinhole size. The thermal conduction property of composite sheet 11 reduces as hole diameter D2 of second through hole 16 becomes larger. Accordingly, hole diameter D2 of second through hole 16 may preferably be equal to or smaller than 0.5 mm to suppress reduction of the thermal conduction property.

Since the periphery of thermally-conductive sheet 12 and inner wall surface 17 of each first through hole 15 in composite sheet 11 are sealed so that thermally-conductive sheet 12 is not exposed, it is possible to prevent an electrically conductive powder (a graphite powder, for example) from scattering from thermally-conductive sheet 12, and thus to suppress a failure caused by the electrically conductive powder.

First insulating sheet 13 includes base layer 13a made of an insulating film, and adhesive layer 13b stacked on one surface of base layer 13a. Base layer 13a is made of a polyethylene terephthalate insulating film having a thickness of about 10 µm. Adhesive layer 13b is made of an acrylic adhesive layer having a thickness of about 10 µm. First insulating sheet 13 is bonded to thermally-conductive sheet 12 and second insulating sheet 14 via adhesive layer 13b.

Second insulating sheet 14 includes base layer 14a made of an insulating film, and adhesive layer 14b stacked on base layer 14a at a first surface 14d of insulating sheet 14 facing thermally-conductive sheet 12. Second insulating sheet 14 further includes adhesive layer 14c stacked on base layer 14a at a second surface 14e of insulating sheet 14 opposite to the first surface 14d. Base layer 14a is made of a polyethylene terephthalate insulating film having a thickness of about 10 µm. Each of adhesive layer 14b and adhesive layer 14c is made of an acrylic adhesive layer having a thickness of about 10 µm. Second insulating sheet 14 is bonded to thermally-conductive sheet 12 and first insulating sheet 13 via adhesive layer 14b.

Inside first through hole 15, first insulating sheet 13 and second insulating sheet 14 are adhered to each other with adhesive layer 13b and adhesive layer 14b to form insulating lamination portion 18. Insulating lamination portion 18 seals inner wall surface 17 of first through hole 15.

Second insulating sheet 14 includes adhesive layer 14c laminated at the second surface 14e of insulating sheet 14 exposed outside of composite sheet 11. Composite sheet 11 can be adhered to an external device via adhesive layer 14c, thereby improving the working efficiency at the time of adhering composite sheet 11 to the external device. Adhering composite sheet 11 to the external device through adhesive layer 14c further improves the thermal conduction property between composite sheet 11 and the external device.

Materials of thermally-conductive sheet 12 other than the graphite sheet that have high thermal conductivities include, e.g. a gold film, a silver film, an aluminum film, and a copper film.

Composite sheet 11 has end portion 21, first region 22 which is close to end portion 21, and second region 23 which is farther from end portion 21 than first region 22.

Composite sheet 11 has, in second region 23, high density region 25 have a large number of second through holes 16 per unit area. When composite sheet 11 is adhered to an external device, second region 23 which have the large number of second through holes 16 per unit area provides a high effect of suppressing cause of air bubbles, and thus, is superior in the thermal conduction property.

Composite sheet 11 has, in first region 22, low density region 24 which is a small number of second through holes 16 per unit area. When composite sheet 11 is adhered to an external device, first region 22 allows air to be easily exhausted even if first region 22 has a small number of second through holes 16 per unit area, and thus can suppress cause of air bubbles. In composite sheet 11, the part where second through holes 16 exist has a lower thermal conduction property than the part where second through hole 16 does not exist. First region 22 which has the small number of second through holes 16 per unit area is superior in the thermal conduction property.

In composite sheet 11, the number of second through holes 16 per unit area in first region 22 is smaller than the number of second through holes 16 per unit area in second region 23. With this configuration, composite sheet 11 can realize superior thermal conduction property while effectively suppressing cause of air bubbles.

4. Configuration of Battery Pack

Figure 3C:
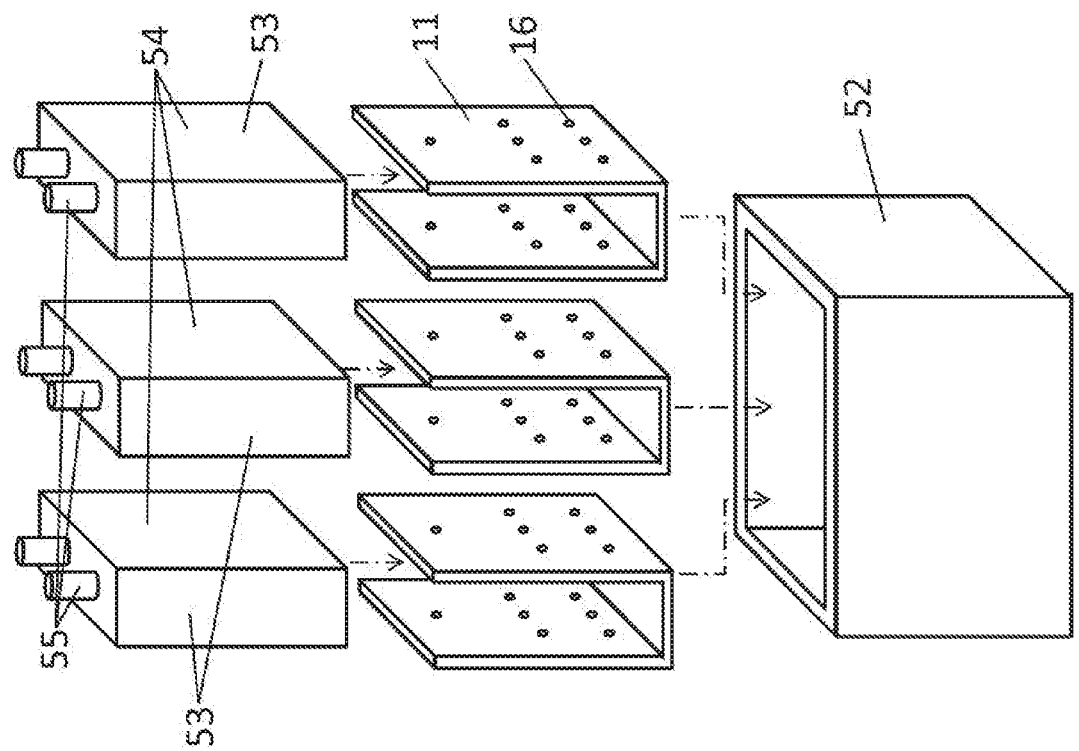
FIG. 3C is an exploded perspective view of the battery pack shown in FIG. 3A.

A battery pack including the composite sheet in accordance with the exemplary embodiment will be described below with reference to FIGS. 3A to 3C. FIG. 3A is a sectional view of battery pack 51 in accordance with the exemplary embodiment. FIG. 3B is a sectional view of composite sheet 11 used in construct battery pack 51. FIG. 3C is an exploded perspective view of battery pack 51 shown in FIG. 3A.

As shown in FIGS. 3A and 3C, battery pack 51 includes plural battery cells 53 which are disposed and fixed inside metal case 52. Composite sheet 11 is bonded to outer surfaces 54 of each battery cell 53. Each battery cell 53 is a square lithium ion battery having a pair of terminal electrodes 55 disposed on its upper surface. As shown in FIGS. 3A to 3C, composite sheet 11 is bonded to battery cell 53 to cover from one side surface through bottom surface to another side surface of battery cell 53. Composite sheet 11 is adhered to reduce the temperature distribution within battery cell 53 and to dissipate heat from the bottom surface through composite sheet 11 to case 52, thereby suppressing a temperature rise of battery cell 53.

In composite sheet 11, thermally-conductive sheet 12 made of a graphite sheet has plural first through holes 15 provided therein. Inner wall surface 17 of each of plural first through holes 15 is sealed with insulating lamination portion 18. Pinhole-size second through hole 16 is provided in insulating lamination portion 18 inside each first through hole 15. This configuration suppresses air bubbles caused between battery cell 53 and composite sheet 11 even if the size of battery cell 53 is large, thus preferably dissipating heat.

5. Effects of Battery Pack

A lithium ion secondary battery equipped with plural battery cells are often easily degraded in a case where large temperature differences are caused inside each battery cell or large temperature differences among the battery cells are caused. Also, since the lithium ion secondary battery generally has a large current capacity and generates a more amount of heat as the amount of flowing current increases, the battery cells may be degraded due to temperature rise.

On the other hand, in battery pack 51 in accordance with the present exemplary embodiment including composite sheet 11 having second through holes 12, air bubbles are hardly caused between each battery cell 53 and composite sheet 11, hence providing superior thermal uniformity and heat dissipation property. In other words, battery pack 51 can reduce local temperature differences in each battery cell 53 and temperature differences among battery cells 53, and also can suppress a temperature rise of each battery cell 53. Accordingly, it is possible to suppress degradation of each battery cell 53, so that superior reliability and long-life of battery pack 51 can be realized.

In a case where battery cell 53 is a square lithium ion battery, the amount of heat generated becomes largest in the region near the pair of terminal electrodes 55. Accordingly, battery pack 51 is configured so that the number of second through holes 16 per unit area in a region near the pair of terminal electrodes 55 is smaller than the number of second through holes 16 per unit area in a region far from the pair of terminal electrodes 55. This configuration further reduces the temperature distribution in battery cell 53, hence increasing the life of battery pack 51.

Although a composite sheet and a battery pack in one or plural aspects have been described above based on the above-described exemplary embodiments, the present invention is not limited to those exemplary embodiments. Other embodiments which can be constructed by making various modifications that may be conceived by a person skilled in the art to the above-described exemplary embodiments and other embodiments which can be constructed by combining components of different exemplary embodiments or their modifications may be included within the scope in one or more aspects.

INDUSTRIAL APPLICABILITY

The present disclosure is applicable to composite sheets for dissipating heat of, for example, battery packs.

REFERENCE MARKS IN THE DRAWINGS 11 composite sheet
12 thermally-conductive sheet
12a, 12b surface
13 first insulating sheet
14 second insulating sheet
15 first through hole
16 second through hole
17 inner wall surface
18 insulating lamination portion
14c adhesive layer
14d first surface
14e second surface
21 end portion
22 first region
23 second region
24 low density region
25 high density region
51 battery pack
52 case
53 battery cell
54 outer surface
55 terminal electrode

The invention claimed is:

1. A composite sheet comprising:
a thermally-conductive sheet;
a first insulating sheet that covers one surface of the thermally-conductive sheet; and
a second insulating sheet that covers another surface of the thermally-conductive sheet, and seals the thermally-conductive sheet between the first and second insulating sheets,
wherein the thermally-conductive sheet has one or more first through holes provided therein,
wherein the composite sheet has one or more insulating lamination portions in which the first insulating sheet is stacked on the second insulating sheet, each of one or more insulating lamination portions seals an inner wall surface of respective one of the one or more first through holes,
wherein each of the one or more insulating lamination portions has respective one of one or more second through holes being disposed inside respective one of the one or more first through holes and having a hole diameter which is smaller than a hole diameter of the first through holes, and
wherein the one or more second through holes allow air to pass through the one or more second through holes.

2. The composite sheet according to claim 1, wherein the thermally-conductive sheet is a graphite sheet.

3. The composite sheet according to claim 1, wherein the second insulating sheet has an adhesive layer that is provided at a second surface of the second insulating sheet opposite to a first surface the second insulating sheet which faces the thermally-conductive sheet.

4. The composite sheet according to claim 1, wherein the hole diameter of the one or more first through holes is equal to or smaller than 3 mm.

5. The composite sheet according to claim 1, wherein the hole diameter of the one or more second through holes is equal to or smaller than 0.5 mm.

6. The composite sheet according to claim 1,
wherein the composite sheet has an end portion, a first region, and a second region which is farther from the end portion than the first region, and
wherein a number of the one or more second through holes per unit area in the first region is smaller than a number of the one or more second through holes per unit area in the second region.

7. A battery pack comprising:
a case;
a battery cell disposed inside the case; and
a composite sheet bonded to an outer surface of the battery cell,
wherein the composite sheet includes:
a thermally-conductive sheet;
a first insulating sheet that covers one surface of the thermally-conductive sheet; and
a second insulating sheet that covers another surface of the thermally-conductive sheet, and seals the thermally-conductive sheet between the first and second insulating sheets,
wherein the thermally-conductive sheet has one or more first through holes provided therein,
wherein the composite sheet has one or more insulating lamination portions in which the first insulating sheet is stacked on the second insulating sheet, each of one or more insulating lamination portions seals an inner wall surface of respective one of the one or more first through holes, and
wherein each of the one or more insulating lamination portions has respective one of one or more second through holes being disposed inside respective one of the one or more first through holes and having a hole diameter which is smaller than a hole diameter of the first through holes.

8. The battery pack according to claim 7,
wherein the battery cell includes a pair of terminal electrodes, and
wherein a number of the one or more second through holes per unit area in a first region of the composite sheet is smaller than a number of the one or more second through holes per unit area in a second region which is farther from the pair of terminal electrodes than the first region of the composite sheet.

9. The composite sheet according to claim 1, wherein the one or more second through holes are not filled.

10. The battery pack according to claim 7, wherein the one or more second through holes allows air to pass through the one or more second through holes.

11. The battery pack according to claim 10, wherein the one or more second through holes are not filled.

\* \* \* \* \*